Feb. 7, 1933. A. BOTTINI 1,896,063
DEVICE FOR THE TRANSPORTATION AND TRANSPOSITION OF VEHICLES AND THE LIKE
Filed Aug. 7, 1931 3 Sheets-Sheet 1
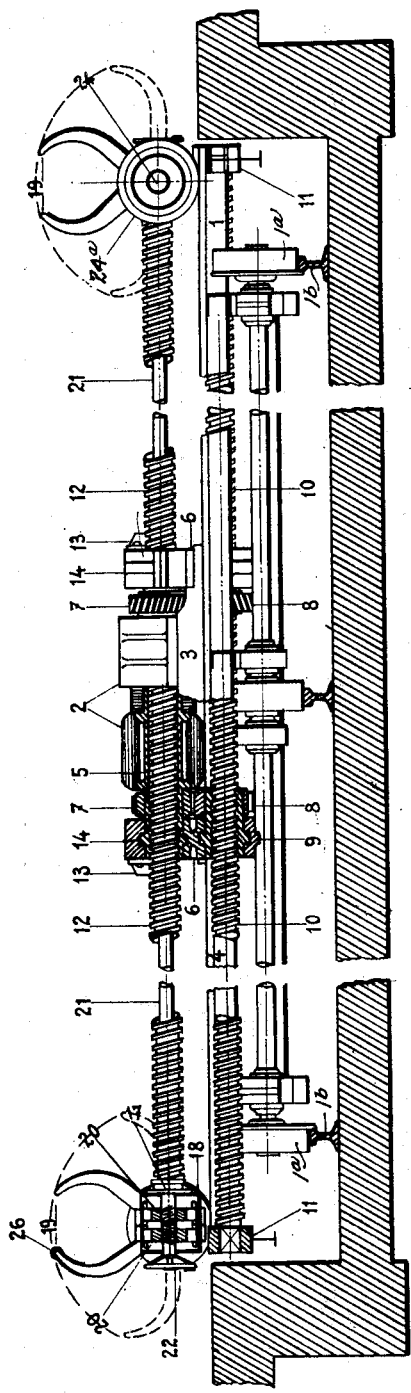
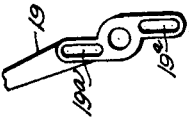
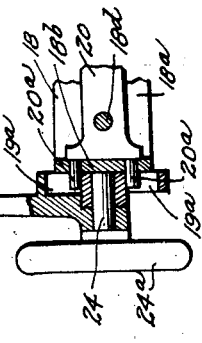
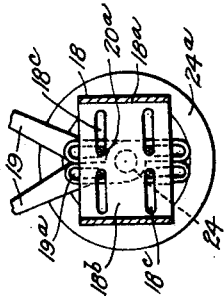
Inventor:
Aldo Bottini
By [signature]
Atty.

Feb. 7, 1933. A. BOTTINI 1,896,063
DEVICE FOR THE TRANSPORTATION AND TRANSPOSITION OF VEHICLES AND THE LIKE
Filed Aug. 7, 1931 3 Sheets-Sheet 2

Inventor:
Aldo Bottini

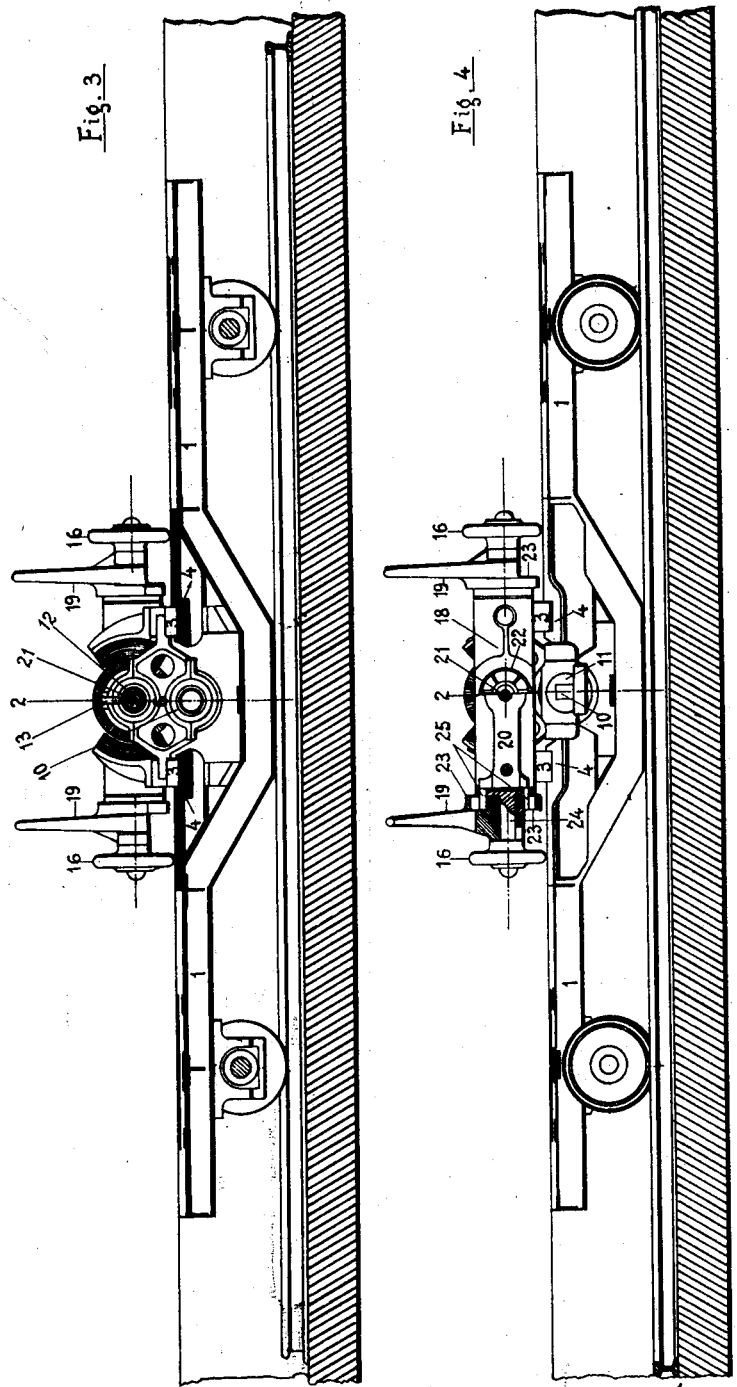

Patented Feb. 7, 1933                                                                                                 1,896,063

UNITED STATES PATENT OFFICE

ALDO BOTTINI, OF BUENOS AIRES, ARGENTINA

DEVICE FOR THE TRANSPORTATION AND TRANSPOSITION OF VEHICLES AND THE LIKE

Application filed August 7, 1931. Serial No. 555,734.

This invention relates to apparatus for handling vehicles, particularly motor vehicles, and has generally in view to provide a novel apparatus for use in garages and other places to facilitate the movement of vehicles into and from stalls or storage spaces, thus to conserve space and time in the handling of the vehicles.

With the foregoing general purpose in view the invention consists in the provision of a vehicle handling apparatus embodying the novel features of construction, combination and arrangement of parts as will be hereinafter more fully described, illustrated in the accompanying drawings and defined in the appended claims.

In the drawings, wherein like characters of reference denote corresponding parts in the different views:

Figure 1 is a view partly in side elevation and partly in longitudinal section of a vehicle handling apparatus constructed in accordance with one practicable embodiment of the invention.

Figure 3 is a transverse sectional view of the apparatus.

Figure 4 is an end view, partly in section, of the apparatus.

Figure 5 is an enlarged detail side elevation illustrating the mounting of the vehicle engaging arms of the apparatus and the means whereby said arms are moved between operative and inoperative positions.

Figure 6 is a detail sectional view at right angles to Figure 5 illustrating the means for moving the vehicle engaging arms; and Figure 7 is a detail elevation of the inner end portion of one of the vehicle engaging arms.

Figure 2:
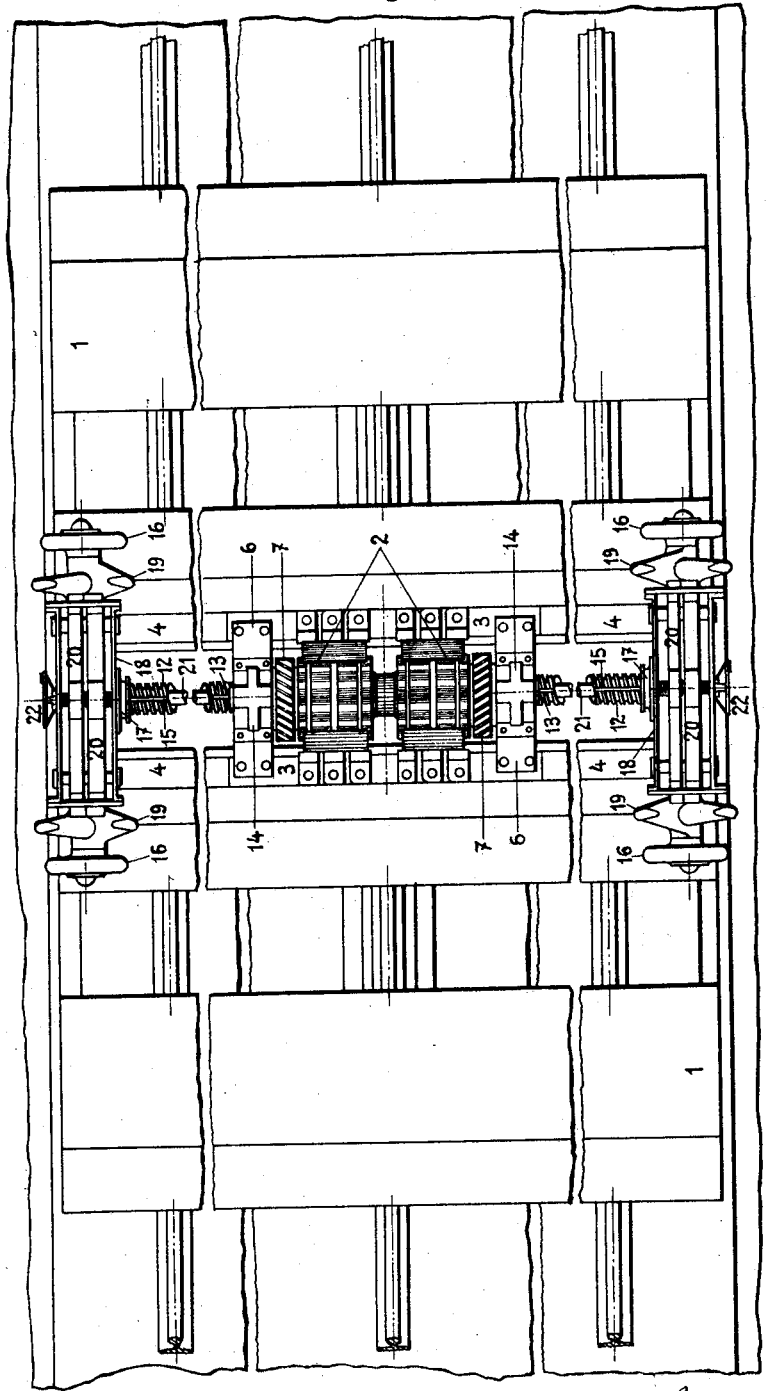
Figure 2 is a top plan view of the apparatus illustrated in Figure 1.

Referring in detail to the practicable embodiment of the invention illustrated in the drawings, it will be observed that the apparatus includes, essentially, a truck, designated generally as 1, provided with wheels 1a whereby the same is adapted for longitudinal movement, preferably on track rails 1b, which rails may be mounted, for example, in a floor depression as illustrated in Figure 1 to dispose the top of the truck level or approximately level with the floor surface on which the vehicles are to be stored. Alternately, the apparatus may be mounted on an elevator for use at each floor of a vehicle storage building or garage.

A motor carriage 3 is mounted on transverse frame elements of the truck 1, medially thereof, for free sliding movement transversely of the truck, and on said motor carriage is mounted a motor 2 the rotor of which is provided with a hollow shaft 5 suitably journaled in the carriage 3 so as to be freely rotatable but non-longitudinally movable with respect thereto.

Fixed to the hollow rotor shaft 5 is a gear 7 which meshes with a gear 8 mounted on a hollow shaft 9 disposed directly below the hollow shaft 5, the said shaft 9, as in the case of the shaft 5, being suitably mounted in the carriage 3 for free rotation but non-longitudinal movement relative thereto.

The hollow shaft 9 is internally threaded and has extending therethrough and in threaded engagement therewith a screw member 10 which extends transversely of the truck from side to side thereof and at its ends is suitably secured to side frame elements of the truck in such manner that it is held against rotation. It thus follows that since rotation of the motor rotor effects rotation of the hollow shaft 9, operation of the motor produces movement of the motor carriage transversely of the truck, because of the screw threaded connection of the shaft 9 with the non-rotatable screw member 10 and because of the motor frame being required to move with the shaft 9 as the latter travels along the screw member 10. In this connection it is pointed out that the motor 2 is of a reversible type whereby the carriage 3 may be moved in either direction transversely of the truck, and that, as regards the rotatable, non-longitudinally movable connections of the hollow shafts 5 and 9 with the motor carriage, such connections may conveniently comprise, as shown, external annular flanges on said shafts engaging corresponding grooves in these portions of the motor carriage in which said shafts are journaled.

The hollow motor shaft 5 is internally screw threaded and has extending therethrough and in threaded engagement therewith a hollow screw member 12 having a splined connection with the motor frame whereby it is held against rotation, said splined connection comprising in the present instance a key element 13 carried by the motor frame and engaging a longitudinally extending keyway 15 formed in said screw member. Thus it follows that rotation of the motor rotor not only is effective to move the motor carriage 3 transversely of the track 1 as previously stated, but also is effective to move the screw member 12 longitudinally with respect to said motor carriage. In this connection the pitch and the direction of the threads of the screw members 10 and 12 preferably are the same, although not necessarily so, whereby, for any given amount of movement of the motor carriage transversely of the truck 1 the screw member 12 is moved twice such amount. In other words, operation of the motor 2 not only produces longitudinal movement of the screw member 12 bodily with the carriage along the screw member 10, but produces additional longitudinal movement of said screw member 12 due to the rotation of the motor shaft 5 relative to said screw member.

The screw member 12 is suitably connected at each end with a related box-like housing 18 whereby said housings are movable transversely of the truck 1 in accordance with longitudinal movements of said screw member. Each housing 18 is composed of side plates 18a and end plates 18b, and in order that said housings may be supported for travel transversely of the truck the end plates of each housing are provided with outwardly directed axles 24 carrying wheels 24a which engage top plates of the truck 1.

A pair of hook elements 19 are pivotally mounted on each axle 24 for swinging movement between raised and lowered, operative and inoperative positions as illustrated by full and dotted lines, respectively, in Figure 1 of the drawings, and novel means is provided, operable from either side of the truck 1, for moving said elements between said positions.

As best illustrated in Figure 7 of the drawings, each hook element 19, to either side of its pivot 24, is slotted as indicated at 19a, the said slots extending vertically when the hook element is in an operative or upright position. The end plates 18b of each box-like housing are provided with upper and lower horizontal slots 18c. On guide rods 18d extending between the side plates 18a of each housing are slidably mounted a pair of bars 20, 20, provided at their ends with upper and lower pins 20a which extend through the slots 18c and into the slots 19a of the hook members. That is to say, the bars 20, 20 are disposed in side to side relationship with the upper pin at each end of one bar disposed in the upper slot 19a of one hook member and the lower pin of the same bar disposed in the lower slot of the other hook member, the upper pin of the other bar being disposed in the upper slot of the second mentioned hook member and the lower pin of the same bar being disposed in the lower slot of the first mentioned hook member. Consequently, lateral separation of the bars 20, 20 obviously is effective to swing each pair of the hook members 19, 19 downwardly and outwardly or to an inoperative position as illustrated by dotted lines in Figure 1, while relative inward movement of said bars obviously is effective to swing each pair of the hook elements upwardly and inwardly to an operative position as illustrated by full lines in Figure 1.

The means for relatively moving the bars 20, 20 together and away from each other to raise and lower the hook members 19 comprises a shaft 21 extending through the hollow screw member 12 and provided at each end with right and left hand threaded portions, respectively, having right and left hand threaded engagement with the related pairs of bars 20, 20. Consequently, rotation of said shaft 21 in one direction is effective to separate the bars 20, 20, thus to effect downward swinging movement of the four pairs of hook members to inoperative positions, and rotation of said shaft in the opposite direction is effective to move the bars 20, 20 relatively inwardly thus to cause the several hook members to be swung upwardly to raised or operative positions. The shaft 21 extends through each of the box-like housings 18 and is equipped at each end with a hand wheel 22 whereby the shaft may be rotated by an operator stationed at either side of the truck 1 to simultaneously actuate all of the hook members. If desired the hook members may be covered as indicated at 26 to prevent marring of a vehicle with which they come into contact.

As an example of the operation of the device, let it be assumed that the hook members are in lowered position and that a vehicle has been moved either under its own power or by the apparatus, or in any other manner, onto the truck 1 with the vehicle disposed transversely of the truck and above the mechanism described. The first operation under such conditions, assuming that a pair of the hook members 19 are disposed in position approximately underlying the front or the rear axle of the vehicle, is to manipulate one or the other of the hand wheels 22 to swing the hook members upwardly to engage the vehicle axle. This eliminates any possibility of the vehicle rolling off the truck and at the same time adapts the apparatus for moving the vehicle off the truck, either forwardly or backwardly, by operation of the motor 2. With the vehicle disposed on the truck 1 and held thereon by the hook members 19, the truck is moved along the track rails 1b either under its own power, which may be furnished by a motor geared to the wheels 1a thereof, or in any other suitable manner, until the truck arrives at a position where it is desired to move the vehicle off the truck onto a floor space at either side of the truck. The truck being halted, the motor 2 is set into operation in the proper direction to move the screw member 12 longitudinally in the direction it is desired to move the vehicle, and since the box-like housings 18 carrying the hook members 19 are movable with said screw member, it follows that operation of the motor 2 results in movement of the vehicle off the truck 1 onto the floor at the desired side of the truck. The shaft 21 then is rotated to lower the hook members 19, the motor 2 is operated to return the screw member 12 to a normal position with its ends disposed inwardly of the sides of the truck, and the truck then is ready to be moved along the track rails 1b to a position to receive another vehicle, in which connection it is obvious that the screw member 12 may be projected in either direction to a position to permit a pair of the hook members 19 to be engaged with an axle of a vehicle to draw the vehicle onto the truck 1 by movement of the screw member 12 in the opposite direction.

From the foregoing description considered in connection with the drawings it is believed that the construction, operation and advantages of the invention will be clearly understood. It is desired to point out, however, that while only a single specific structural embodiment of the invention has been illustrated and described, the invention is readily capable of embodiment in different mechanical structures within the spirit and the scope of the invention as defined in the appended claims.

I claim:—

1. Vehicle handling apparatus comprising a wheeled truck, a fixed screw member mounted transversely of the truck, a motor carriage mounted on the truck for movement transversely thereof, a motor mounted on said carriage, a connection between the motor and said screw member whereby operation of the motor results in movement of the motor transversely of the truck, a second screw member extending longitudinally of the truck, a connection between said second screw member and the motor whereby said second screw member is movable bodily in a longitudinal direction with the motor carriage and also longitudinally with respect to the motor and its carriage by operation of the motor, and vehicle engaging means connected with said second screw member for movement therewith to move a vehicle onto and off the truck.

2. Vehicle handling apparatus comprising a wheeled truck, a motor mounted on said truck for movement transversely thereof, means whereby operation of the motor produces movement thereof transversely of the truck, a screw member extending transversely of the truck and operatively connected with the motor for longitudinal movement bodily therewith and also for longitudinal movement relative to the motor by operation of the motor, and vehicle engaging means connected with said screw member for movement therewith to move a vehicle onto and off the truck.

3. Vehicle handling apparatus comprising a wheeled truck, a motor mounted on said truck, vehicle engaging means operatively connected with said motor for movement thereby transversely of the truck to move a vehicle onto and off the truck, means whereby operation of the motor moves said vehicle engaging means transversely of the truck relative to the motor, and other means whereby operation of the motor moves the motor as an entirety and with it the vehicle engaging means transversely of the truck.

4. Vehicle handling apparatus comprising a wheeled truck, a motor mounted on said truck for movement transversely thereof, said motor having a hollow internally threaded rotor shaft, a screw member extending through said shaft and having threaded connection therewith, means to hold the screw member against rotation whereby operation of the motor is effective to move the screw member longitudinally transversely of the truck, vehicle engaging means carried by said screw member whereby longitudinal movement thereof may be made effective to move a vehicle onto and off the truck, a non-rotatable screw member extending transversely of the truck and fixed thereto, and a connection between the motor and said last mentioned screw member whereby operation of the motor bodily moves the motor and with it the first mentioned screw member transversely of the truck.

5. Vehicle handling apparatus comprising a truck onto and off of which a vehicle is to be moved, and vehicle engaging means mounted on the truck for movement thereover to move a vehicle onto and off the truck, said vehicle engaging means comprising a wheel supported housing, a pair of hook members pivotally mounted on said housing for swinging movement between raised and lowered operative and inoperative positions, a pair of bars mounted within said housing for movement laterally towards and away from each other, operative connections between the hook members and said bars whereby movement of the latter towards and away from each other respectively raise and lower the hook members, and means for imparting relative lateral movement to said bars.

6. Vehicle handling apparatus comprising a truck, a motor mounted thereon, a hollow screw member extending across the truck, means whereby operation of the motor is effective to move said screw member longitudinally across the truck, a housing connected to said screw member at each end thereof, vehicle engaging hook members carried by each housing, a shaft extending through said screw member, means at each end of said shaft for rotating the same, and connecting means between said shaft and all of said hook members whereby rotation of the shaft is effective to move the hook members between raised and lowered operative and inoperative vehicle engaging positions.

7. Vehicle handling apparatus comprising a truck, a motor mounted thereon for movement transversely thereacross, means whereby operation of the motor so moves the same, a hollow screw member extending transversely of the truck and operatively connected with the motor to be moved bodily therewith in a longitudinal direction and also to be moved longitudinally relative to the motor by operation of the motor, a housing connected with each end of said screw member, a pair of hook members pivoted to each housing, a shaft extending through said screw member, means for rotating said shaft, and connections between said shaft and the hook members of the respective housings whereby rotation of said shaft is effective to move the hook members between raised and lowered operative and inoperative vehicle engaging positions.

In testimony whereof I affix my signature.

ALDO BOTTINI.